United States Patent [19]

Faille et al.

[11] 4,056,655

[45] Nov. 1, 1977

[54] PROCESS FOR TREATING POROUS MATERIALS AND PRODUCTS OBTAINED

[75] Inventors: Marc Della Faille, Floree; Pierre Delvaux; Pierre Godard, both of Brussels; Jean Pierre Mercier, Kessel-Lo, all of Belgium

[73] Assignee: S. A. Eternit, Kapelle op den Bos, Belgium

[21] Appl. No.: 654,974

[22] Filed: Feb. 3, 1976

Related U.S. Application Data

[63] Continuation of Ser. No. 429,661, Dec. 28, 1973, abandoned.

[30] Foreign Application Priority Data

Jan. 2, 1973    France .................................. 73.00003

[51] Int. Cl.$^2$ .......................... B32B 19/02; B05D 3/02
[52] U.S. Cl. .................................. 428/443; 428/446; 428/451; 428/539; 427/385 C; 427/399; 427/430 B
[58] Field of Search ............... 427/385 C, 430 B, 386, 427/399, 387; 428/443, 454, 451, 539, 446

[56] References Cited

U.S. PATENT DOCUMENTS

| | | | |
|---|---|---|---|
| 267,217 | 11/1882 | Josia .................................. | 117/118 X |
| 1,151,701 | 8/1915 | MacNichol ....................... | 117/118 X |
| 1,160,363 | 11/1915 | Baekeland ........................ | 117/123 D |
| 1,364,587 | 1/1921 | Sanders et al. ........................ | 117/118 |
| 1,666,423 | 4/1928 | Lammens ............................. | 117/118 |
| 2,720,469 | 10/1955 | Serkin ............................... | 117/118 X |
| 3,051,992 | 9/1962 | Bradley .......................... | 117/119.8 X |
| 3,415,674 | 12/1968 | Voisinet ....................... | 117/123 D X |
| 3,567,496 | 3/1971 | Steinberg et al. ........... | 117/123 D X |
| 3,814,619 | 6/1974 | Kobayashi et al. ........... | 117/119.6 X |
| 3,826,680 | 7/1974 | Rio et al. ...................... | 117/123 D X |

*Primary Examiner*—Ronald H. Smith
*Assistant Examiner*—Evan K. Lawrence
*Attorney, Agent, or Firm*—Cameron, Kerkam, Sutton, Stowell & Stowell

[57] ABSTRACT

A method for processing porous materials with at least one water-insoluble polymerizable compound and the products obtained, said method comprising the following steps in successive order: impregnating a porous material, especially one consisting essentially of a hydraulic binder and a granular or fibrous filler, with said compound; fully covering the thus impregnated material with an aqueous solution of a salt which precipitates when contacted with the hydraulic binder; and polymerizing the compound in the impregnated material while covered with the saline solution.

16 Claims, No Drawings

PROCESS FOR TREATING POROUS MATERIALS AND PRODUCTS OBTAINED

CROSS-REFERENCE TO RELATED APPLICATION

This is a continuation of application Ser. No. 429,661, filed Dec. 28, 1973, now abandoned.

BACKGROUND OF THE INVENTION

1. Field of the Invention

The invention relates to the treatment of porous materials by impregnation with polymeric resins. The object of the invention is a method for treating porous materials, particularly suitable for porous materials, wherein the mean radius of the pores is relatively high. The materials as obtained by the method are also an object of the invention.

2. Description of the Prior Art

The impregnation of porous materials with polymeric resins is generally performed in order to improve the mechanical properties of the material, without altering the other properties, especially their aspect. The porous material to be treated is first impregnated with a polymerizable compound, then this compound is hardened by ensuring its polymerization. The polymerizable compounds used are generally highly volatile monomers, which results in problems in the carrying out of the process, in connection with the losses of the monomer due to its evaporation during the polymerization, which problems have found no satisfactory solution up to now. Indeed, although polymerization under water has been proposed, the known methods still show a great lack of efficiency.

This invention has an essential object to overcome these drawbacks; it also aims at improving the mechanical properties of the materials still further, through a method which can be easily carried out, especially when treating slabs, bricks, pipes or any other structures of stony and porous materials, such as those used in the building industry, especially materials mainly comprising an hydraulic binder and a granular and/or fibrous filler. Another object of the invention is, in a preferred mode of carrying out the method according to the invention, to obtain porous materials of the type described which show high weathering properties, are not altered by water and which retain the initial aspect over extended use, even though in open air.

SUMMARY OF THE INVENTION

According to the invention there is provided: A method for processing porous materials with at least one polymerizable compound, said method comprising the following steps in successive order: impregnating said materials with said compound, fully covering the thus impregnated materials with a saline solution and polymerizing said compound in said materials while kept covered with said saline solution.

According to the invention, there is further provided materials obtained by using said method.

This method may notably be applied to materials having pore sizes corresponding, in the classification by DUBININ M. M. in J. Colloid Interface Sci. 23,1967,487, to the categories of mesopores (from 10 to 250 A radius) or macropores (radius or 250 A and more) up to about 600 Angstroms. However the method of the invention has proved especially valuable when applied to materials with pores belonging to the higher mesopores or the lower macropores, and more specifically having a mean radius higher than 160 A, and preferably higher than 170 A, as measured by the mercury penetration method, in which case the method has shown a surprisingly high efficiency.

The saline solution may be made from any water-soluble salt of organic or inorganic acids. for example, salts having the generic formula $$MX$$

where M is a cation selected from the group consisting of alkali metals, ammonium, and alkaline-earth metals; and X is an anion selected from the group consisting of chlorides, phosphates, oxalates, nitrates, sulphates, and citrates. However, the organic or inorganic salt is preferably used at a concentration of at least 10%, and preferably 30%, of the saturation concentration at the temperature at which the impregnated material is cured or hardened; and salts which do not substantially modify the inherent viscosity of water are preferably used.

DESCRIPTION OF THE PREFERRED EMBODIMENTS

According to a preferred mode of carrying out the invention, the method is applied to stony materials consisting essentially of of an hydraulic binder, such as cement, silico-calcareous binders, gypsum; and of a granular and/or fibrous filler; more particularly to cement - asbestos materials comprising natural cement or artificial cement (Portland cement), asbestos fibers and, if desired, silica or another filler.

A further advantage in processing such materials according to the invention, besides those concerning the mechanical properties, resides in the fact that the preservation properties and stability are improved, since notable shading off due to efflorescences is avoided.

In this case, according to the invention, the preferred saline solution used is an aqueous solution of a salt which will precipitate when contacted with the hydrolyzable components of the material, that is, an aqueous solution of a salt which is capable of reacting with the hydraulic binder to produce an insoluble calcium salt. For said salt, it is preferable that M be a monovalent cation and X be selected from the group consisting of phosphates, oxalates and citrates. More specifically, alkali metal phosphate or ammonium phosphate solutions are particularly advantageous.

In this case, the method according to the invention is particularly effective in avoiding the formation of efflorescences on the thus obtained material, even in the case of an initial material having a high porosity; whereas, usually, high porosity promotes water migration and therefore induces the formation of efforescences.

According to a further mode of carrying out the invention, in which the mechanical properties of the materials treated are particularly improved, the saline solution is an aqueous solution of a salt having X selected from the group consisting of chlorides, phosphates, nitrates, sulphates, and more specifically having M selected from the group consisting of calcium, magnesium, and ammonium.

The concentration of the solutions used in carrying out the invention is advantageously at least of the order of 10% of the saturated solution and preferably of approximately 40–50% of the concentration corresponding to saturation at the polymerization temperature.

However, it should be noted that, in any case, the salt itself does not affect substantially the composition of the material finally obtained, except as regards the zone close to its surface.

Any water-insoluble polymerizable compound or mixture of such compounds may be used as the impregnating substance. Unsaturated monomers are more particularly used, and preferably monomers of styrene or its substituted homologues; acrylic or methacrylic esters; and vinyl monomers, such as styrene, vinyl propionate, methyl methacrylate, vinyl acetate, butyl acrylate, and methyl acrylate.

The polymerization may be initiated by means of any known technique, but preferably by adding a polymerization catalyst and heating to a polymerization temperature in the approximate range of 30° to 150° C, and preferably from 50° to 100° C. The polymerization is preferably carried out while the impregnated material is submerged in a liquid bath made of the saline solution; however, such a solution may also be applied onto the surface of the material, particularly by spraying the solution onto said surface by applying it in a gelled form obtained by addition of a gel-forming substance, such as clay of the bentonite type.

In order to further disclose the invention, specific examples of the impregnating and curing process according to the invention will now be described. It should however be understood that the invention is not at all limited to the examples given.

EXAMPLE I :

Slabs of several products of the asbestos-cement type are dried at 150° C during 24 hours in a ventilated drying oven; then they are submerged in baths of methyl or styrene methacrylate, containing 2% by weight benzoyl peroxide as a polymerizable initiator. The impregnation time is adjusted, depending on the thickness of the slab, so as to obtain the filling ratio desired.

The thus impregnated slabs are subjected to a surface cleaning treatment, immersed in an polymerization bath made of an aqueous solution saturated with calcium chloride, and maintained therein for 8 hours at a temperature of 80° C. The concentration of the solution is approximately 40% of the saturation concentration at the latter temperature. Further slabs, respectively identical with the first ones are similarly impregnated and cured in similar polymerizing conditions, but in a mere water bath.

The loss in monomer during the polymerization is evaluated from the weight decrease, between, on the one hand, the weight increase after the impregnation step and, on the other hand, the weight increase after polymerizing and reheating at 120° C for 6 hours, the said decrease being expressed as a percentage of the initial weight of dry asbestos-cement.

The weight decrease values are reported in the following table where the bonding strength of the finally obtained materials is also indicated. The bending strength is measured either when the material is under dry conditions, that is, after the latter has been kept 24 hours at 120° C, or under wet conditions, that is, after it has been submerged 48 hours in water. The values (weight variation and bending strength) corresponding to a non-impregnated material are indicated for comparison purposes. The characteristics of the starting materials are indicated after the table.

The favourable effect resulting from the presence of calcium chloride is evident in all cases from the value of the bonding strength. Furthermore, the loss in monomer is negligible or very low, and more specifically it is substantially reduced with respect to the loss of monomer observed for specimens cured in a water bath, in the case of products 2, 3, 4, 5, which have pore radii of at least 160 A.

The results obtained are substantially the same when the monomer impregnating bath further comprises 15 ppm of an inhibitor such as ter- butylcatechol.

All bending strengths are measured according to ASTM C 580 standards.

Table

Example 1

| Products and processing conditions | Weight variation in % of the dry weight of asbestos-cement | | Bending strength | |
|---|---|---|---|---|
| | after impregnation | after impregnation and reheating | wet kg/cm² | dry kg/cm² |
| Product no. 1 | | | | |
| Non-impregnated | — | — | 375 | 355 |
| M cured in water | 13.0 | 13.0 | 645 | 465 |
| N cured in CaCl₂ | 12.4 | 12.4 | 685 | 590 |
| Product no. 2 | | | | |
| Non-impregnated | — | — | 415 | 490 |
| M cured in water | 9.8 | 9 | 650 | 535 |
| M cured in CaCl₂ | 9.8 | 9.8 | 620 | 545 |
| S cured in water | 7.6 | 6.9 | 590 | 505 |
| S cured in CaCl₂ | 7.5 | 7.5 | 620 | 665 |
| Product no. 3 | | | | |
| Non-impregnated | — | — | 190 | 320 |
| M cured in water | 12.1 | 7.4 | 535 | 460 |
| M cured in CaCl₂ | 12.4 | 11.5 | 645 | 570 |
| Product no. 4 | | | | |
| Non-impregnated | — | — | 165 | 190 |
| M cured in water | 17.5 | 14.9 | 370 | — |
| M cured in CaCl₂ | 19.5 | 18.3 | 425 | — |
| S cured in water | 17.0 | 16.3 | 385 | — |
| S cured in CaCl₂ | 16.3 | 16.1 | 405 | — |
| Product no. 5 | | | | |
| Non-impregnated | — | — | 170 | 300 |
| M cured in water | 17.4 | 12.3 | 485 | 520 |
| M cured in CaCl₂ | 17.6 | 16.5 | 575 | 560 |
| S cured in water | 16.7 | 14.2 | 545 | — |
| S cured in CaCl₂ | 16.7 | 16.2 | 585 | — |

Legend :
M = impregnated with methyl methacrylate
S = impregnated with styrene.

Definition of the starting products

Product of the no. 1 type:
| | | |
|---|---|---|
| Compound | Cement | 360 parts (by weight) |
| | Silica | 270 parts |
| | Asbestos | 150 parts |
| Working up | Extrusion | |
| Mean pore radius | 80 A. | |

Product of the no. 2 type:
| | | |
|---|---|---|
| Compound | Cement | 300 parts (by weight) |
| | Silica | 200 parts |
| | Asbestos | 58 parts |
| Working up | Hatschek Machine | |
| Mean pore radius | 160 A. | |

Product of the no. 3 type:
| | | |
|---|---|---|
| Compound | Cement | 500 parts (by weight) |
| | Asbestos | 71 parts |
| Working up | Hatschek Machine | |
| Mean pore radius | 190 A. | |

Product of the no. 4 type:
| | | |
|---|---|---|
| Compound | Cement | 100 parts (by weight) |
| | Asbestos | 14 parts |
| Working up | Hatschek Machine | |
| Mean pore radius | 220 A. | |

Product of the no. 5 type:
| | | |
|---|---|---|
| Compound | Cement | 330 parts (by weight) |
| | Asbestos | 93 parts |
| | Cellulose | 52 parts |
| Working up | Hatschek Machine | |
| Mean pore radius | 400 A. | |

The mean pore radii are measured from the amount of mercury penetrated under pressure in a specimen of the material.

EXAMPLE II

The starting products are impregnated and cured under the same conditions as in example I, but for the saline solution which is ammonium phosphate or magnesium chloride instead of calcium chloride. The concentration of the saline solution is approximately 40% of the saturation concentration at the curing temperature.

Table

| Products and processing conditions | Example II Weight variation in % of the dry weight of asbestos-cement | | Bending strength wet kg/cm² |
|---|---|---|---|
| | after impregnation | after impregnation and reheating | |
| Product no. 2 | | | |
| M cured in ammonium phosphate | 9.7 | 9.7 | 600 |
| S cured in ammonium phosphate | 7.5 | 7.5 | 620 |
| Product no. 4 | | | |
| M cured in ammonium phosphate | 19.3 | 18.7 | 420 |
| S cured in ammonium phosphate | 16.4 | 16.2 | 400 |
| S cured in magnesium chloride | 17.3 | 17.1 | 415 |

EXAMPLE III

Injected pipes (product n° 4, defined in example I) are dried at 150° C in a ventilated drying oven during 24 hours and then impregnated by maintaining them, during 8 hours, in a methyl-methacrylate bath containing 2% by weight of benzoyl peroxide and no inhibitor.

The impregnated pipes are cured at 80° C, during 8 hours, in an aqeuous solution saturated with calcium chloride. Then the pipes are dried at 120° C during 6 hours.

The thus obtained pipes contain an amount of 16% by weight of the polymerized resin, which means that 83% of the pores volume has been filled. The bursting strength of the pipes after the treatment is 79 kg/cm², while that of non-impregnated tubes is only 30 kg/cm². It is measured according to the Belgian Standard test N B N 615.

Similar pipes are treated in a similar manner, but for the impregnating bath which is now a styrene bath containing 2% by weight of benzoyl peroxide and no inhibitor.

The thus obtained pipes also contain an amount of resin of 16% by weight with respect to the total pipe weight, which again means a filling of the pores of 83%. The bursting strength is 88 kg/cm².

EXAMPLE IV

Pipes similar to those of Example III are dried at 150° C during 24 hours in a ventilated drying oven, then impregnated through immersion thereof in a styrene bath containing 15 ppm inhibitor and 2% by weight benzoyl peroxide. The polymerization is carried out at 80° C during 8 hours in a solution of calcium chloride at 40% of the saturation concentration. Thereafter, the pipes are dried during 6 hours at 120° C.

The pipes as thus treated contain an amount of resin of 13% by weight, with respect to the total pipe weight, which means that 66% of the pores volume has been filled. The bursting strength is 66 kg/cm², against 30 kg/cm² in the case of non-impregnated pipes.

EXAMPLE V

This example relates to the treatment of high pressure pipes, made of asbestos-cement (weight proportions: 412 parts of cement, 75 parts of asbestos, pore radius=270° A). The pipes have a diameter of 100 mm, a thickness of 18 mm and a length of 700 mm.

a. the pipes are dried during 24 hours at 150° C in a ventilated oven, then impregnated through immersion thereof during 8 hours in a methyl-methacrylate bath, with no inhibitor, containing 2% by weight benzoyl peroxide. The polymerization is carried out in a solution of calcium chloride, during 8 hours at 80° C. The concentration of the solution is 40% of saturation at this temperature. Then, the pipes are dried at 120° C during 6 hours. The amount of the polymerized resin in the impregnated material is 10% by weight, which means that 81% of the pore volume has been filled. The bursting strength is 372 kg/cm², and the crushing strength is 806 kg/cm². The corresponding values for non-impregnated pipes, are respectively 267 kg/cm² and 570 kg/cm².

b. the pipes are dried by air blowing during 24 hours at 20° C and then impregnated through immersion thereof during 8 hours in a methyl-methacrylate bath, free of inhibitor, and containing 2% by weight of benzoyl peroxide. The polymerization is carried out at 80° C in a solution of calcium chloride, at a concentration of 40% with respect to saturation, during 8 hours. Then the pipes are dried at 120° C during 6 hours. The content of the polymerized resin in the thus impregnated products is about 10% by weight, which means that 78% of the pore volume is filled. The mechanical properties are as follows:

Bursting strength: 422 kg/cm²
Crushing strength: 986 kg/cm².

EXAMPLE VI

The conventional laboratory test for determining whether or not a material has a tendency to suffer from efflorescence growth upon weathering, consists in placing a slab of the same in an air-cooled vessel at a temperature of − 18° C. The volume above the slab is alternately swept, during 4 hours, with wet air at ambient temperature and 4 hours with dry air at 40° C, in order to give rise to condensation and evaporation phenomena. Generally, all asbestos-cement samples which have been impregnated and then cured in water exhibit afflorescences due to the release of calcium and to the formation of calcium carbonate at the surface of the material.

When the polymerization is carried out in a saline solution containing ammonium phosphate, the filling ratio is increased and the mechanical properties are improved; and furthermore, the efflorescence growth is considerably decreased, which results in a water stable material.

Thus, asbestos-cement slabs of the type n° 2 as defined in Example I, are impregnated with styrene and cured at 80° C during 8 hours in ammonium phosphate solution, the concentration of which is approximately 40% of the saturation concentration at the curing temperature. These samples, when submitted to the efflorescence test described above for a period of 2 months, do not exhibit any efflorescence growth.

In order to evaluate the effectiveness of the impregnation and polymerization process of the invention with respect to the retention of soluble calcium, asbestos-cement-and-resin samples are subjected to 100 extracting cycles in soxhlets, and the calcium released in the course of each cycle is weighed.

The results reported in the table below show the amount of calcium released in the case of slabs of n° 1 type.

The impregnation is performed in a styrene bath during different times. The polymerization is effected at 80° C, during 8 hours, either in water or in an ammonium phosphate bath.

| Impregnation time | Curing under | CaO released | E |
|---|---|---|---|
| hours | | mg | |
| — | — | 885 | 1 |
| 2 | Water | 800 | 1.1 |
| 25 | " | 750 | 1.2 |
| 250 | " | 560 | 1.6 |
| 2 | Phosphate | 100 | 8.9 |
| 25 | " | 150 | 5.9 |
| 250 | " | 120 | 7.4 |

E is the ratio of the total calcium released by a nonimpregnated slab to that freed by one as obtained by the impregnating and curing process.

These results show that resin-impregnation followed by polymerization in water only slightly reduces the amount of calcium released, the reduction varying with the impregnation time, i.e., with the time the material is dipped in the monomer, and therefore, with the impregnation or filling ratio. But the quantities of solubilizable calcium are greatly reduced when the polymerization is carried out in an ammonium phosphate solution, which reduction explains why the thus impregnated materials are efflorescence-proof.

EXAMPLE VII

Silico-calcareous asbestos slabe having the following composition, by weight:
Cement: 300 parts
Asbestos: 58 parts
Silica: 200 parts
are impregnated by using a styren bath containing 2% by weight benzoyl peroxide, during respectively 2,25 and 250 hours, and then polymerized at 80° C during 70 hours in an ammonium phosphate solution at 40% of the saturation concentration.

Extraction tests, performed as indicated in Example VI, result to E values of 6.4, 4.4, and 5.9, respectively.

Of course, the various examples described have been given only in order to better illustrate the carrying out of the method according to the invention, and should by no means limitate its scope.

What we claim is:

1. A method for processing porous materials comprising in successive order the steps of: impregnating, with at least one water-insoluble polymerizable compound, a porous material consisting essentially of a hydraulic binder and a filler selected from the group consisting of granular and fibrous fillers; fully covering the thus impregnated material with an aqueous solution of a salt which does not substantially modify the inherent viscosity of water and heating said impregnated material to a polymerization temperature for said compound and maintaining said temperature to polymerize said compound in said material while covered with said solution, wherein said solution is a solution of a salt which precipitates when contacted with said hydraulic binder in said material, said solution having a concentration of at least 10% of the saturation concentration at the polymerization temperature.

2. A method according to claim 1 wherein said porous materials has a mean pore radius of at least 160 A.

3. A method according to claim 2, wherein said material is an asbestos-cement.

4. A method according to claim 1, wherein said concentration of said solution is at least 30% of said saturation concentration at the temperature.

5. A method according to claim 1, wherein said impregnating step includes maintaining said materials in a liquid bath of said polymerizable compound for a period from 1 to 300 hours.

6. A method for treating porous materials comprising in successive order the steps of: impregnating with at least one water-insoluble polymerizable compound, a porous material consisting essentially of a hydraulic binder and a filler selected from the group consisting of granular and fibrous fillers; fully covering the impregnated material thus obtained with an aqueous solution of a salt having the generic formula

MX where M is a cation and X is an anion selected from the group consisting of chlorides, phosphates, oxalates, nitrates, sulphates, and citrates; and heating said impregnated material to a polymerization temperature for said compound and maintaining said temperature to polymerize said compound in said material while covered with said solution, wherein said solution is a solution of a salt which precipitates when contacted with said hydraulic binder in said material, said solution having a concentration of at least 10% of the saturation concentration at the polymerization temperature, whereby the mechanical properties of said material is improved.

7. A method according to claim 6 wherein said cation M is selected from the group consisting of alkali metals, ammonium and alkaline-earth metals.

8. A method according to claim 7, wherein said material is an asbestos-cement.

9. A method according to claim 8, wherein said asbestos-cement has a mean pore radius of at least 160 A.

10. A method for treating porous materials comprising in successive order the steps of: impregnating, with at least one water-insoluble polymerizable compound, a porous material consisting essentially of a hydraulic calcareous binder and a filler selected from the group consisting of granular and fibrous fillers said material having a mean pore radius of at least 160A; fully covering the impregnated material thus obtained with an aqueous solution of a salt having the generic formula

MX where M is a cation selected from the group consisting of ammonium, alkali metals, and alkaline-earth metals; and X is an anion selected from the group consisting of chlorides, phosphates, oxalates, nitrates, sulphates, and citrates; and heating said impregnated material to a polymerization temperature for said compound and maintaining said temperature to polymerize said compound in said material while covered with said solution, wherein said solution has a concentration of at least 10% of the saturation concentration at the polymerization temperature, whereby the mechanical properties of said material is improved.

11. A method according to claim 10, wherein said concentration of said solution is at least 30% of said saturation concentration at the temperature.

12. A method according to claim 10 wherein said anion X is selected from the group consisting of chlorides and phosphates.

13. A method according to claim 12 wherein said material is asbestos-cement.

14. A method for treating porous materials comprising in successive order the steps of: impregnating, with at least one water-insoluble polymerizable compound a porous material consisting essentially of a hydraulic calcareous binder and a filler selected from the group consisting of granular and fibrous fillers, said material having a mean pore radius of at least 160A; fully covering the impregnated material thus obtained with an aqueous solution of a salt selected from the group consisting of alkali-metal phosphates and ammonium phosphates; and heating said impregnated material to a polymerization temperature for said compound and maintaining said temperature to polymerize said compound in said material while covered with said solution, wherein said solution has a concentration of at least 10% of the saturation concentration at the polymerization temperature, whereby the mechanical properties and resistance to efflorescence formation of said materials are improved.

15. A method according to claim 14 wherein said material is asbestos-cement.

16. A polymer impregnated porous material consisting essentially of a porous asbestos cement having a mean pore radius of at least 160 A impregnated with a water-insoluble polymerized monomer, said monomer being polymerized within said asbestos cement at a polymerization temperature while said impregnated cement is covered by an aqueous solution of a salt having the generic formula

MX where M is a cation selected from the group consisting of ammonium, alkali metals, and alkaline-earth metals; and X is an anion selected from the group consisting of chlorides, phosphates, oxalates, nitrates, sulphates, and citrates said solution having said solution having a concentration of at least 10% of the saturation concentration at the polymerization temperature.

* * * * *